(12) United States Patent
Lurie et al.

(10) Patent No.: US 6,420,706 B1
(45) Date of Patent: Jul. 16, 2002

(54) OPTICAL DETECTORS USING NULLING FOR HIGH LINEARITY AND LARGE DYNAMIC RANGE

(75) Inventors: Michael J. Lurie, Princeton; Robert Amantea, Manalapan; Francis P. Pantuso, Robbinsville, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/479,636

(22) Filed: Jan. 7, 2000

Related U.S. Application Data

(60) Provisional application No. 60/115,295, filed on Jan. 8, 1999.

(51) Int. Cl.$^7$ .................................................. G01J 5/10
(52) U.S. Cl. ................................................. 250/338.1
(58) Field of Search ....................................... 250/338.1

(56) References Cited

U.S. PATENT DOCUMENTS

| | | | |
|---|---|---|---|
| 3,415,712 A | | 12/1968 | Barker, Jr. |
| 3,896,309 A | | 7/1975 | Halsor et al. |
| 4,762,426 A | | 8/1988 | Foss |
| 5,054,936 A | | 10/1991 | Fraden |
| 5,449,909 A | | 9/1995 | Kaiser et al. |
| 5,450,053 A | * | 9/1995 | Wood ........................ 338/18 |
| 5,550,516 A | | 8/1996 | Burns, et al. |
| 5,623,147 A | * | 4/1997 | Baert et al. ............ 250/338.1 |
| 5,844,238 A | | 12/1998 | Sauer et al. |
| 6,140,646 A | * | 10/2000 | Busta et al. ................ 250/332 |

FOREIGN PATENT DOCUMENTS

| | | |
|---|---|---|
| WO | WO 95/02170 | 1/1995 |
| WO | WO 95/02180 | 1/1995 |
| WO | WO 96/08701 | 3/1996 |
| WO | WO 97/26556 | 7/1997 |

OTHER PUBLICATIONS

J.R. Barnes et al., "Photothermal spectroscopy with femtojoule sensitivity using a micromechanical device" *Nature*, vol. 372, pp. 79–81 (Nov. 3, 1994).

P.I. Oden et al. "Optical and Infrared Detection Using Microcantilevers" Department of Physics, University of Tennessee, pp. 1–10 (Apr. 1996).

Chalamala et al., "Fed up with Fat Tubes" *IEEE Spectrum*, pp. 42–51 (Apr. 1998).

Ken Werner "The flowering of flat displays", *IEEE Spectrum*, pp. 40–49 (May 1997).

* cited by examiner

*Primary Examiner*—Constantine Hannaher
(74) *Attorney, Agent, or Firm*—William J. Burke

(57) ABSTRACT

An infrared radiation detector includes a bolometer or micro-cantilever detector device which functions as a null detector in conjunction with electronic circuitry. The electronic circuitry senses a change in an output signal of the detector as the detector responds to infrared radiation incident upon the detector and provides a signal to a control element which provides a stimulus to the detector device to maintain the detector output signal at the same level. The element may be a piezoelectric element, a heater or a pair of electrodes and the corresponding stimulus may be stress, heat, or electrostatic change. The stimulus compensates for the effect of the infrared radiation and maintains the chosen detector output level at the same level. The nulling circuitry improves the linearity and dynamic range of the detector device.

19 Claims, 4 Drawing Sheets

OPTICAL DETECTORS USING NULLING FOR HIGH LINEARITY AND LARGE DYNAMIC RANGE

RELATED APPLICATION

This application claims priority of U.S. Provisional Application Ser. No. 60-115,295, inventors Michael J. Lurie, Robert Amantea, and Francis P. Pantuso, entitled Optical Detectors Using Nulling For High Linearity and Large Dynamic Range, filed on Jan. 8, 1999.

TECHNICAL FIELD

This invention relates generally to infrared radiation detectors and methods for converting infrared radiation to a visible image. More particularly, the invention relates to a nulling circuit coupled to an infrared radiation sensor such as a micro-electromechanical device or a bolometer device formed on a semiconductor substrate. The present invention also provides for an increased linearity and dynamic range of the micro-electromechanical or bolometer device being used as an infrared radiation

BACKGROUND OF THE INVENTION

Various optical detectors such as infrared radiation detectors are available in today's electronics industry. Many techniques for converting infrared radiation to visible images, are also known. One such example of an infrared imager available in today's art includes a deflectable micro-electromechanical (MEM) cantilever device formed of a bi-material on a semiconductor substrate. The bi-material portion of the micro-cantilever device is formed of two different materials sharing a contiguous surface, and having mismatched thermal coefficients of expansion (TCE). Examples of such bi-material MEM micro-cantilever devices and methods for forming the same, are as disclosed in U.S. Pat. No. 5,844,238 issued to Sauer et al. and U.S. Pat. No. 6,140,646, issued to Lurie et al.

The bi-material MEM micro-cantilever devices presently available in the art, bend, or deflect, when infrared radiation is absorbed upon an absorber element of the micro-cantilever heating the bi-material section of the micro-cantilever, thereby urging one of the bi-materials to expand at a greater rate than the other bi-material, thereby causing the micro-cantilever to deflect, or bend. The terms bend and deflect may be used interchangeably hereinafter. An example of a micro-cantilever such as known of the art, may be seen in FIGS. 1 and 2.

FIG. 1 is a cross sectional view showing micro-cantilever 100. Micro-cantilever 100 is suspended over substrate 200. Space 140 forms the opening between substrate 200 and micro-cantilever 100. Micro-cantilever 100 includes thermal isolation region 120, bi-material region 110, and absorber region 130. Within absorbing region 130, absorber material 210 helps to absorb infrared radiation which may be incident upon the micro-cantilever structure. In bi-material region 110, first bi-material film 215 and second bi-material 220 are present. Bi-material films 215 and 220 share a contiguous surface and have mismatched thermal coefficients of expansion. Therefore, when infrared radiation is incident upon the MEMs structure, the micro-cantilever 100 is heated and bends because of the two bi-material films 215 and 220 expand at different rates. FIG. 1 shows micro-cantilever 110 in a "rest" position, not exposed to infrared radiation.

FIG. 2 shows the micro-cantilever structure of FIG. 1 in a deflected or bent position. The distance Δx indicates the height of deflection of the deflectable portion of the micro-cantilever, above the rest position. Various means are available in the art to provide an optical image having an intensity which varies along with the degree of the deflection, for example Δx, of the micro-cantilever structure. More generally, various means are available in the art to provide an optical image having an intensity which is determined by the amount of infrared radiation sensed by an infrared sensor.

It can be seen that a drawback of the present technology lies in the fact that such a micro-cantilever structure can only bend to a certain degree. A physical limitation to the extent of bending of the micro-cantilever exists. This limits the dynamic range and the range of linearity of the device.

When infrared radiation is incident upon such a micro-cantilever being used as an optical detector, it is desired to produce a visible image having an intensity which varies directly with the intensity of the incident infrared radiation. As a micro-cantilever device bends in response to such incident infrared radiation, it approaches a physical limitation to its degree of bending. For example, if a micro-cantilever device is fabricated so as to bend downward in response to incident infrared radiation, the physical limitation is reached when the micro-cantilever touches the substrate over which it is formed. For a micro-cantilever device chosen to bend upward in response to incident infrared radiation, this, too, will reach a physical limitation point past which it can no longer bend. As such, when this point of the physical limitation of bending is approached, the micro-cantilever device is more resistant to bending and therefore, less responsive to additional infrared radiation. An increased amount of incident infrared radiation will not cause the same extent of bending as when the micro-cantilever is in the rest position. While a significantly higher dose of infrared radiation may force the micro-cantilever to bend slightly more towards its physical limitation, the degree of this bending will not be proportional, so the device will not be linear in this region. Thus, the linear range of the device is limited.

Moreover, after the physical limitation point is reached, additional incident infrared radiation will simply not cause any further bending. This limits the dynamic range of the device. Since the intensity of an optical image ultimately produced from such a device, is based on the degree of bending, it can be seen that such a device having a poor dynamic range and limited linearity, produces an image having the same shortcomings.

Various methods for sensing the degree of bending are available in the art. Examples of such methods include optically measuring the distance between the micro-cantilever and the substrate, and electrically measuring the capacitance of a capacitor which includes an electrode formed in the substrate and another electrode formed in the micro-cantilever above the substrate. Various methods for producing a visible image having an intensity based upon the extent of bending, are also known.

Methods for producing various embodiments of micro-cantilever structures are available in the art, for example, methods for forming various micro-cantilever devices are disclosed in U.S. Pat. No. 5,844,238 as above. The present art also includes various configurations of physical micro-cantilever or other MEM structures. For example, FIGS. 3 and 4 show two embodiments of MEM structures which bend in response to incident infrared radiation. Each of the structures shown in FIGS. 3 and 4, include a bendable bi-material arm 150 and an absorber area 152. It can be understood that, in addition to the structures shown in FIGS.

1–4, various other configurations for MEMs structures which bend or deflect in response to incident radiation, can be used and have been provided in the art.

The present invention addresses the shortcoming of the limited dynamic range and limited linearity of the optical detectors using bi-material MEMs structures available in the art, by providing an optical detector using nulling circuitry along with an infrared sensor, for increased linearity and increased dynamic range.

SUMMARY OF THE INVENTION

The present invention embodies both the method and apparatus for converting infrared radiation to a visible image. The present invention provides a micro-electromechanical (MEM) device formed on a semiconductor substrate. The device includes a deflectable micro-cantilever formed of a bi-material element. The deflectable micro-cantilever is suspended above the substrate and bends in response to incident infrared radiation. Nulling circuitry is also provided and coupled to the micro-cantilever. The position of the micro-cantilever, or extent of bending may be sensed using optical, capacitive, or other means. As the micro-cantilever begins to bend in response to infrared radiation, the nulling circuitry detects the bending, and provides a signal to an element capable of providing a stimulus to restore the micro-cantilever to its original position. Examples of such elements include a resistor/heater, an electrostatic element, or a piezoelectric element. The signal which is supplied to the element, tends to maintain the micro-cantilever in its original position. Therefore, the strength of the signal required to maintain the micro-cantilever at its original position varies with the degree of incident infrared radiation. The signal supplied to the element is monitored and a visible image is formed having an intensity which is proportional to the signal supplied to the element. In this matter, the linearity of the system is independent of the detector itself.

The present invention also provides a bolometer coupled to similar nulling circuitry and thermally coupled to a heater/resistor. The bolometer serves as a detector of infrared radiation. When the bolometer is exposed to incident infrared radiation and the resistivity of the bolometer begins to change, the nulling circuitry detects the changed resistivity and provides a signal to the heater/resistor to compensate for the incident radiation and to maintain the bolometer at a constant resistivity. As in the micro-cantilever example, a visible image may be formed having an intensity which is proportional to the signal supplied to the heater/resistor.

DETAILED DESCRIPTION OF THE INVENTION

Figure 1:
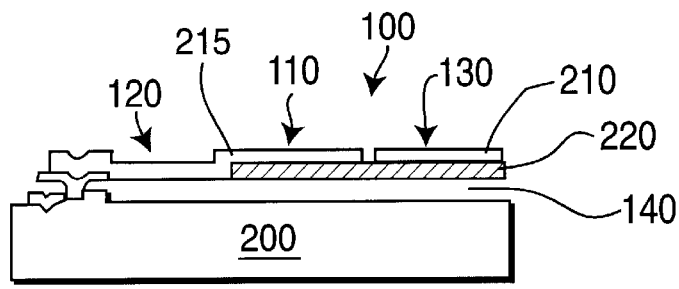
FIG. 1 is a cross-sectional view of a micro-cantilever as in the prior art.

The present invention provides an improved method and apparatus for detecting optical radiation and is particularly useful for detecting infrared radiation. It provides an infrared radiation detector with increased linearity and dynamic range and which finds application within many types of detectors, including single point detectors and imaging arrays. Examples of specific detector types which may be incorporated as part of the present invention, include a bolometer and a bi-material micro-cantilever infrared detector, such as described in U.S. Pat. No. 5,844,238, issued to Sauer et al.

The principle of the invention is to use a detector as a null detector, meaning that some parameter of the detector is adjusted so that the detector always operates at the same detector output signal level. The strength of the incoming signal such as incident energy, is then determined by the amount of adjustment needed to maintain the detector at that constant signal level. For example, a detector signal level which may remain fixed, or constant, may be a resistance for a bolometer or it may be the amount of deflection for a deflectable micro-cantilever. Conventional detectors, in contrast, simply allow the incoming signal such as incident energy to change the detector signal level and then measure that detector signal level and produce an image having an intensity based on that measured detector signal. Because of the limited linearity and limited dynamic ranges of conventional devices, however, such a direct method is less viable.

For example, in a typical thermal sensor used to detect infrared radiation such as a bolometer, the incident infrared radiation heats the sensor, causing a change in resistance which is measured electrically. The variation of resistance with incident radiation is linear over only a limited range, however. The same principle is true for a micro-cantilever device used as a thermal sensor. In a micro-cantilever device, the incident infrared radiation heats the sensor causing the micro-cantilever to deflect either up or down. The degree of deflection or bending is measured electrically. The relationship between the degree of bending and the intensity of incident radiation is linear over only a limited range. Detectors vary in their linear and dynamic ranges, but all include limitations determined by the physical composition and structure of the detectors. These limitations provide particular problems in imaging devices in that an increased intensity of incident infrared radiation does not produce a correspondingly increased image signal.

The present invention provides a system having a linearity which is independent of the detector itself. The present invention includes a nulling circuit. Alternatively stated, the detector acts as a null detector. When infrared radiation is incident upon a detector, an output signal from the detector such as resistivity in a bolometer or degree of deflection in a micro-cantilever, is produced. The output signal is proportional to the degree of incident infrared radiation within the linear range of the device. The output signal produced in response to incident infrared radiation is different than the original output signal produced by the device not being exposed to incident infrared radiation. The nulling circuitry senses the difference in the signal and provides a further signal to an element capable of producing a stimulus to the detector which restores the detector to its original output signal. The magnitude of the signal necessary to restore the detector output signal to an essentially constant value, is monitored. If the time constant and correction is factors of the nulling circuitry are chosen appropriately, the detector output signal may vary only briefly from its original level before it is returned to its original output signal level. It can therefore be alternatively stated that the detector output signal is substantially maintained at a constant value.

As the strength of the incident infrared radiation exceeds the point past which the linear range of the device would be otherwise exceeded, the present invention provides for the signal provided to the element to be adjusted correspondingly in order to maintain the detector at its original signal output level. The signal provided to the element, then, can be seen to be proportional to the intensity of incident infrared radiation being sensed. Because this signal applied to the element keeps the element operating in its linear range, the linearity of the system is independent of the detector itself. Conventional electronic methods may then be used to produce a visible image having an intensity being proportional to an electronic signal, such as the signal provided to the element.

Various exemplary embodiments of optical detectors using nulling for high linearity and large dynamic range are described below. Although the various optical detectors are described in terms of a single detector, it should be understood and emphasized that such detectors are primarily intended to be incorporated within arrays of detectors which, together, form an infrared imager. In the exemplary embodiment, the individual detectors are arranged in rows and columns. The multitude of individual detectors which together form the array, may each represent a pixel within an image being produced. As such, it can be best understood how the advantage of the increased linearity and increased dynamic range can be best appreciated, most particularly to show the various dynamic ranges within a particular view of an image.

I. Bi-Material Micro-Cantilever Devices

Micro-cantilever devices formed on semiconductor substrates for use as infrared imagers are available in the prior art and are as briefly described above. The present invention utilizes various basic embodiments of a base structure for micro-cantilever device. Three such exemplary embodiments of base structures are shown in FIGS. 5A–5C in addition to the base structure of a micro-cantilever shown in FIGS. 1 and 2 above.

Figure 5A:
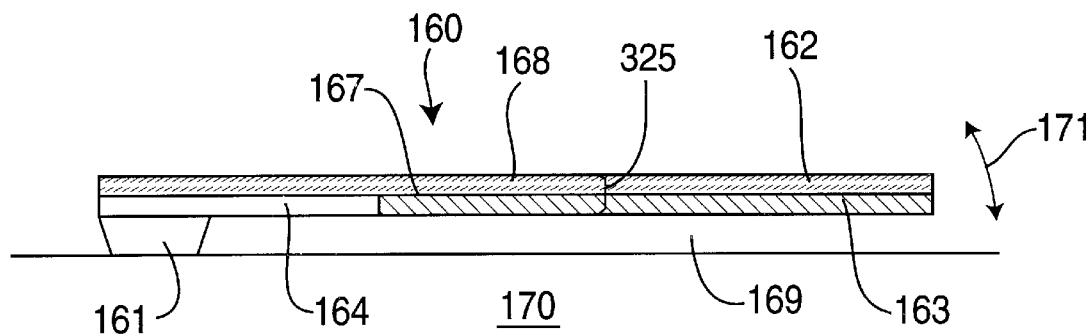
FIGS. 5A, 5B, and 5C are cross-sectional views showing various configurations of micro-cantilever devices.
Figure 5B:
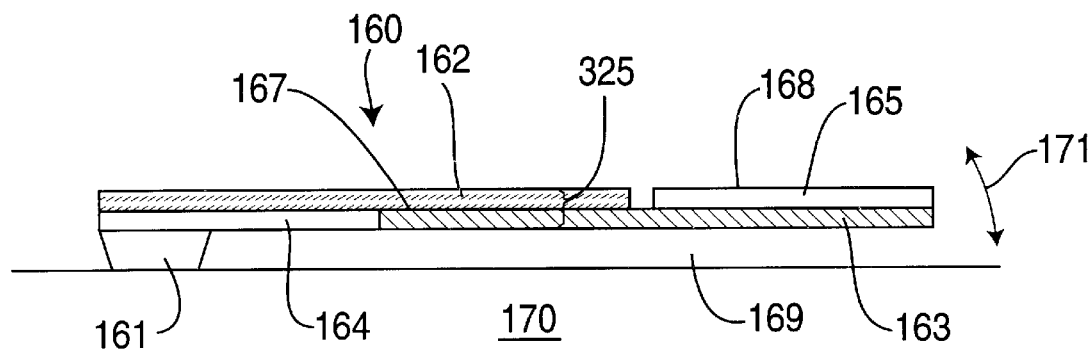
Figure 5C:
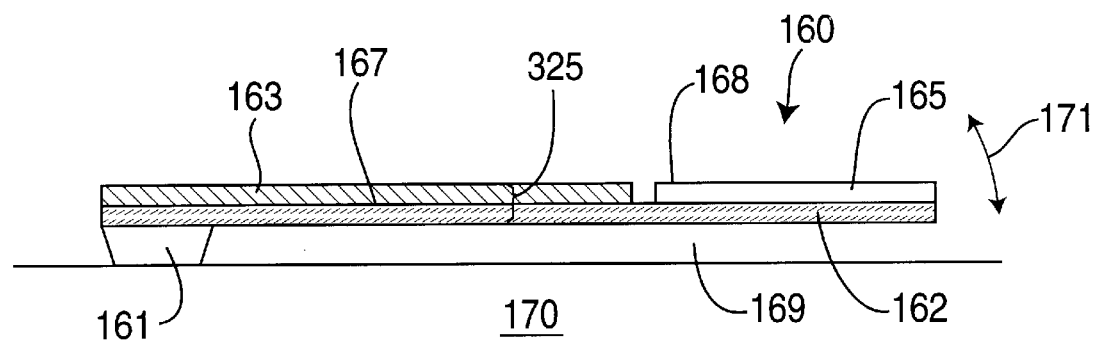

Each of FIGS. 5A–5C shows a cross-sectional view of micro-cantilever 160 formed and suspended above substrate 170. In each of FIGS. 5A–5C, micro-cantilever 160 is suspended over substrate 170 by space 169, and attached to substrate 170 by anchor 161. Substrate 170 is a semiconductor substrate as available in the art. In the preferred embodiment, semiconductor substrate 170 is desirably transparent to infrared radiation. It should be understood that, in the preferred embodiment, the infrared detector of the present invention may be exposed to infrared radiation from either the top or bottom of the micro-cantilever device. As such, various alternative embodiments to the configurations are also possible. It should be understood, however, that in all cases, the micro-cantilever device is adapted to serve as an infrared radiation sensor to infrared radiation which is incident upon the top 168 of the micro-cantilever 160.

Bi-material 325 is formed of two materials including first bi-material 162 and second bi-material 163 which are in confronting relation and share common boundary 167. The principles of operation of bi-material micro-cantilever devices are well known and briefly described above. In an exemplary embodiment, first bi-material 162 may be a semiconductor or dielectric material such as silicon carbide and second bi-material 163 may be a conductive material such as copper. It can be seen that in various exemplary embodiments such as in FIGS. 5A and 5B, conductive second bi-material 163 may form the lower section of the micro-cantilever while in other exemplary embodiments such as shown by FIG. 5C, conductive second bi-material film 163 may form an upper bi-material film of the micro-cantilever device. Exemplary embodiments may include a thermal isolation structure 164 to isolate the bi-material 325 from the thermal properties of the substrate 170. According to another exemplary embodiment, first bi-material 162 may also act as a thermal insulator, as shown in FIG. 5C, and the thermal isolation device 164 may not be needed. An absorber material 165 may be used to absorb infrared radiation and therefore increase the efficiency of the micro-cantilever detector. However, in alternative embodiments wherein the bi-material film which is being exposed to infrared radiation is a good absorber material, an additional absorber material 165 may not be needed. In response to absorbed infrared radiation, micro-cantilevers 160 may bend along arcuate path 171. It should be emphasized that the three embodiments of micro-cantilever base structures shown in FIGS. 5A–5C are just that—exemplary. Various other configurations of base structures for micro-cantilevers are contemplated.

The materials used and methods for forming, the micro-cantilever devices used as part of the present invention, are as described in U.S. Pat. No. 5,844,238, issued to Sauer et al., and U.S. Pat. No. 6,140,646, issued to Lurie et al.

Regardless of the specific configuration and materials used, micro-cantilevers are adapted to bend in response to incident infrared radiation. They may bend either up or down in response to absorbed infrared radiation, depending the on the materials used to form the micro-cantilever and their relative placement. The bending of the micro-cantilever may be measured by at least the following two methods: by measuring capacitance between a conductive film formed on the micro-cantilever and a conductive film formed within the substrate below the micro-cantilever; and optically measuring the height above the substrate which the deflectable plate is deflected.

According to the present invention, various exemplary embodiments of methods to urge the deflection of the micro-cantilever, are presented. Examples of such methods include: providing an electrostatic charge between a conductive plate on the micro-cantilever and another conductive plate in the substrate below the micro-cantilever; heating the micro-cantilever; and, coupling a piezoelectric element to the micro-cantilever which applies stress to the micro-cantilever causing it to bend. Once absorbed infrared radiation causes an initial bending of the micro-cantilever in one direction, the present invention provides for using the preceding methods to urge bending in the opposite direction, so as to counteract the effect of absorbed infrared radiation and maintain the micro-cantilever at a substantially fixed position, preferably in its linear range.

Figure 2:
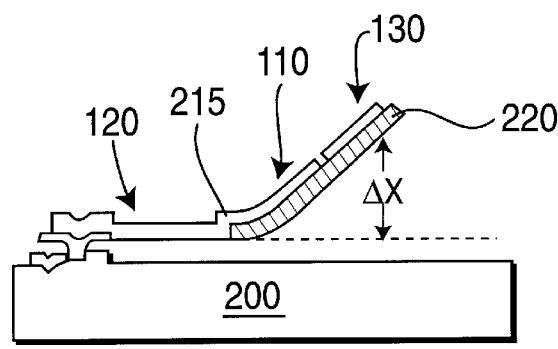
FIG. 2 is a cross-sectional view of the prior art micro-cantilever shown in FIG. 1, in a deflected position.
Figure 6:
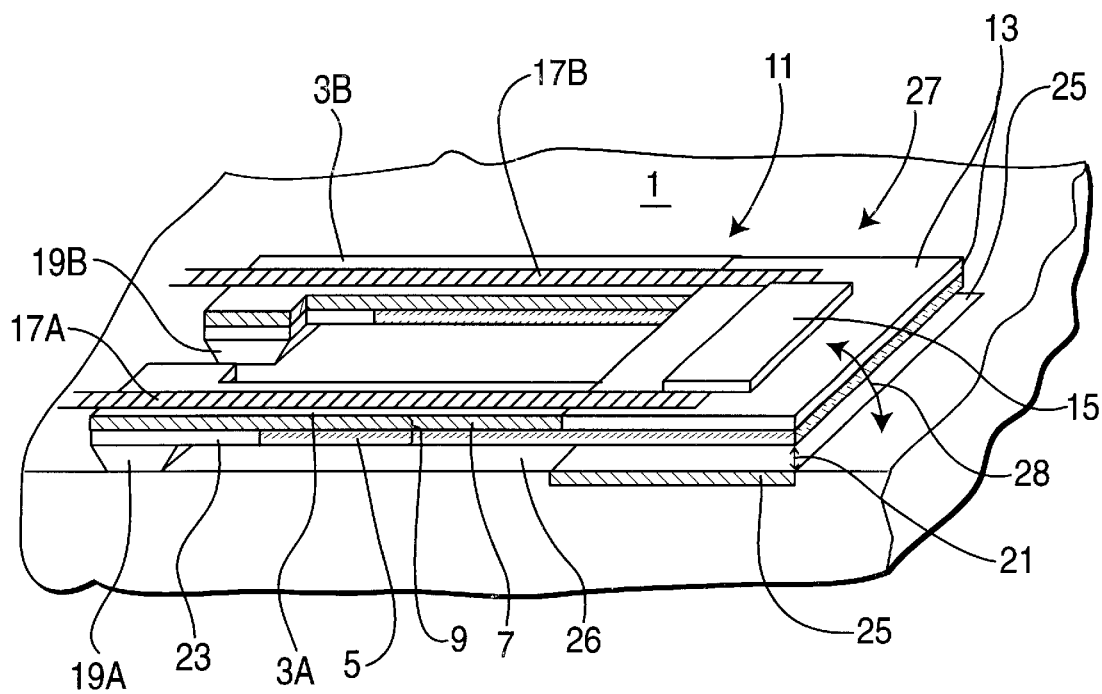
FIG. 6 is a perspective view of an exemplary embodiment of a micro-cantilever according to the present invention.

FIG. 6 is a perspective view showing an exemplary embodiment of a micro-cantilever according to the present invention. Micro-cantilever 11 is formed and suspended over substrate 1 by a space 26, and is attached to substrate 1 by means of anchors 19A and 19B. Micro-cantilever 11 is thermally isolated from substrate 1 by means of thermal isolation film 23. Micro-cantilever 11 includes two bendable arms 3A and 3B. Micro-cantilever 11 includes bi-material 9 which is formed of lower bi-material 5 and upper bi-material 7. Absorber material 13 is included on deflectable gate region 27 of micro-cantilever 11. In its un-bent and resting position, micro-cantilever 11 is suspended over substrate 1 by distance 21. When incident infrared radiation is absorbed by absorber material 13 and heats each of bi-material 5 and bi-material 7, the micro-cantilever 11 bends or deflects along arcuate path 28. The bending phenomena of the micro-cantilever device is also shown in FIGS. 1 and 2.

Micro-cantilever 11 also includes element 15 formed in deflectable gate region 27. Conductive gate 25 is formed within substrate 1 beneath deflectable gate region 27 and element 15 of micro-cantilever 11. Conductive wires 17A and 17B electrically couple element 15 to other devices and circuitry (not shown). It should be understood that conductive wires 17A and 17B are electrically isolated from upper bi-material 7 by means of a dielectric film disposed between upper bi-material 7 and the conductive wires (not shown). Various methods for forming and patterning element 15 and conductive wire 17A and 17B are available in the art.

Figure 3:
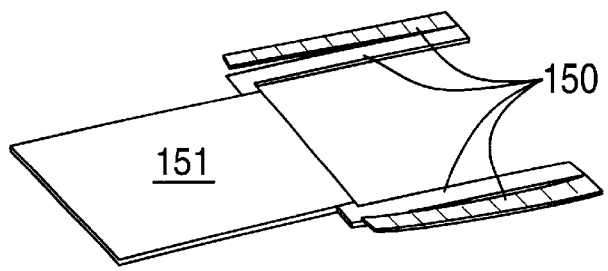
FIG. 3 shows a micro-cantilever with folded support arms as in the prior art.
Figure 4:
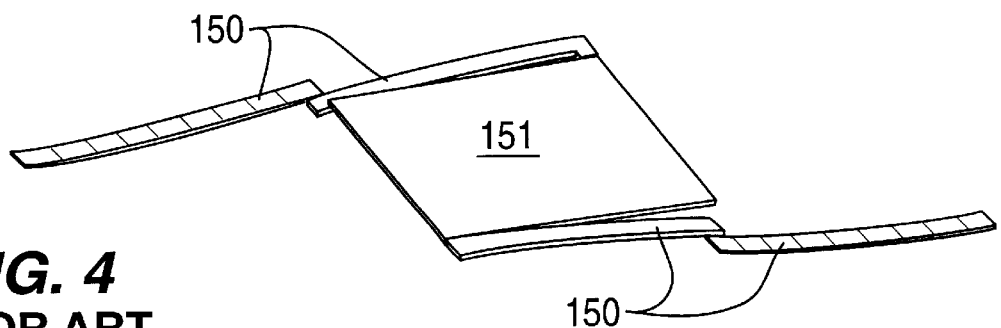
FIG. 4 shows a bridge-style micro-cantilever as in the prior art.

It should be understood that various other micro-cantilever configurations may be used alternatively. Examples include the structures shown in FIGS. 3 and 4. It should also be understood that various other base structures, as shown and described in conjunction with FIGS. 1, 2, 5A, 5B and 5C may be used alternatively. It should be further understood that the materials used and methods for forming the micro-cantilever are as known in the art and as described previously. For example, either of lower bi-material 5 and upper bi-material 7 may be a conductive material.

According to one exemplary embodiment, element 15 may be a heat generating element. An example of a heat generating element may be a resistor formed of a material such as nichrome or aluminum but other devices and materials which heat up in response to a supplied current, may be used alternatively. Conventional methods may be used to form and pattern heat generating element 15 and to couple heat generating element 15 to other (nulling) circuitry by means of conductive wires 17A and/or 17B. When an input current is supplied to heat generating element 15 by means of either of conductive wires 17A or 17B, heat generating element 15 heats up. Heat generating element 15 is in thermal contact with absorber material 13 within deflectable gate region 27. As such, micro-cantilever 11 deflects along path 28 responsive to heat supplied by heat generating element 15.

In this configuration, the heating element heats the bi-material element in the absence of infrared radiation to achieve a desired level of deflection. As incident radiation increases, the amount of heat provided by the heating element is decreased to maintain the device of the desired level of deflection.

According to a second exemplary embodiment, element 15 may be a conductive plate 15. When used in conjunction with conductive plate 25 formed within substrate 1, element 15 may be used to provide an electrostatic charge which urges the deflection of micro-cantilever 11. An example of such an electrostatic charge may be by producing an electric field between conductive plates 15 and 25. According to the second exemplary embodiment, any suitable conductive film such as aluminum or copper may be used to form conductive plate 15, and conventional methods may be used to form and electrically couple conductive plate 15 to other nulling circuitry (not shown) to produce an electrostatic charge across conductive plates 15 and 25.

According to each of the first and second exemplary embodiments, nulling circuitry is coupled to element 15 and is adapted to provide a signal to element 15 to urge the deflection of micro-cantilever 11 to counteract the effect of the infrared radiation, by either of the methods described above. The nulling circuitry provides such a signal in response to the output signal from the micro-cantilever indicating its position. The nulling circuitry is also adapted to receive a detector output signal such as capacitance or an optical position measurement.

According to each of the first and second exemplary embodiments, the methods used to detect the degree of deflection of micro-cantilever 11 along path 28 may be by using conventional optical means or using capacitive means. In the embodiments wherein optical means are used, conventional means such as a laser being directed to detecting distance 21 by which micro-cantilever 11 is suspended over substrate 1, may be used. Such techniques are common in the art. Measured distance of deflection is an example of a detector output signal and is supplied to nulling circuitry (not shown) using conventional methods.

Where capacitive means are used, a conductive film is chosen to form element 15 which may be a heat generating element or simply a conductive plate as in the previous exemplary embodiments. Capacitance is measured between the two conductive plates 15 and 25 which form a capacitor. Capacitance varies as the distance between the two electrodes, determined by distance 21, varies. Even in the case where conductive plate 15 is also being used to supply an electrostatic charge, the capacitance between the plate may be measured using an AC voltage supply while electrostatic charge may be applied across the plates 15 and 25 using a DC voltage supply. In this manner, both an electrostatic charge may be applied across the plate to influence the position of the plates, and capacitance may be measured between the plates to measure the position of the plates. Measured capacitance is a representative detector output signal, as above, and this signal may be sensed through coupling of the electrode plates 15 and 25 to nulling circuitry (not shown). Conventional means may be used.

It should be understood that the placement and configuration of element 15 is not intended to be limited to the details shown in FIG. 6. For example, element 15 may be supplied on the underside of micro-cantilever 11 or other locations on the top of the micro-cantilever so long as it can urge the bending of the micro-cantilever. For the case where element 15 is a heat generating element, it is desirably thermally coupled to the bi-material in some manner. It should be further understood that micro-cantilever 11 may alternatively be formed of the micro-cantilever based structures shown in FIGS. 5A–5C. As such, absorber material 13 may not be present. The bi-material films may be in different locations, and the wiring of the element 15, regardless of its configuration and location, may be varied.

Figure 7:
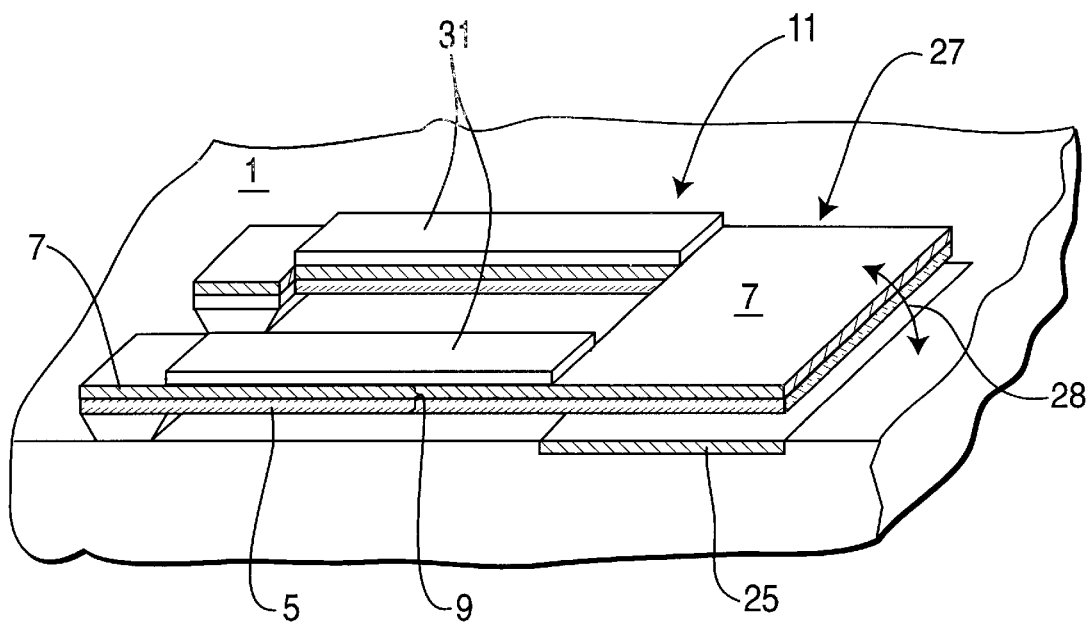
FIG. 7 is a perspective view of another embodiment of a micro-cantilever device according to the present invention.

Now turning to FIG. 7, a perspective view of another exemplary embodiment of a micro-cantilever according to the present invention is shown. Micro-cantilever 11 includes various features as shown and described in conjunction with FIG. 6. For example, conductive film 25 formed within substrate 1 within deflectable gate region 27, is included. Micro-cantilever 11 is formed of bi-material 9 which extends the entire length of the micro-cantilever device. Bi-material 9 includes lower bi-material 5 and upper bi-material 7 which is a conductive material. As such, it can be seen that a capacitor is formed within deflectable gate region 27 and which includes one electrode being conductive bi-material 7 and another electrode which includes conductive plate 25. As such, it can be seen that either the capacitive means or the optical means as described in conjunction with FIG. 6 for determining the amount of deflection of micro-cantilever 11, may be used. It should be further understood that the electrodes 7 and 25 of the capacitor formed within deflectable gate region 27 are electrically coupled to external nulling circuitry (not shown).

Piezoelectric elements 31 are formed on arms 3A and 3B of micro-cantilever 11. Piezoelectric elements 31 are formed such that when a voltage is applied to piezoelectric element 31 the deflection of micro-cantilever 11 is urged along arcuate path 28. It should be further understood, then that piezoelectric element 31 may be formed at various other locations along the micro-cantilever. For example, piezoelectric element 31 may be a single element or it may be formed on the underside of the micro-cantilever 11. Piezoelectric elements 31 are electrically coupled to external nulling circuitry (not shown) and when a voltage is applied to piezoelectric element 31, a stress is produced which either forces the micro-cantilever contacting the piezoelectric element, to deflect towards or away the piezoelectric element. Piezoelectric element 31 may be formed of barium titanate or other suitable piezoelectric materials, and may be formed, patterned, and electrically coupled using conventional means. It should be further understood that the base structure for micro-cantilever 11 shown in FIG. 7, is not intended to be limited to the exemplary embodiment shown. Rather, various other configurations for micro-cantilevers may be used.

For each of the micro-cantilever embodiments described, the micro-cantilever bends responsive to incident infrared radiation absorbed within the micro-cantilever. The micro-cantilever also bends responsive to either stress from piezoelectric element 31 as shown in FIG. 7, an electrostatic charge, or heat provided by element 15 of FIG. 6. In either case, a signal is supplied from nulling circuitry to either element 31 or 15. The signal is provided by the nulling circuitry in response to an initial bending of the micro-cantilever which produces a detector output signal sensed by the nulling circuitry. Regardless of the initial deflection direction, the signal supplied to element 31 or 15 by the nulling circuit (not shown) will result in the element urging the deflection of the micro-cantilever in a direction opposite the initial direction, thereby maintaining the micro-cantilever essentially in its original position.

II. Bolometer Device

Figure 8:
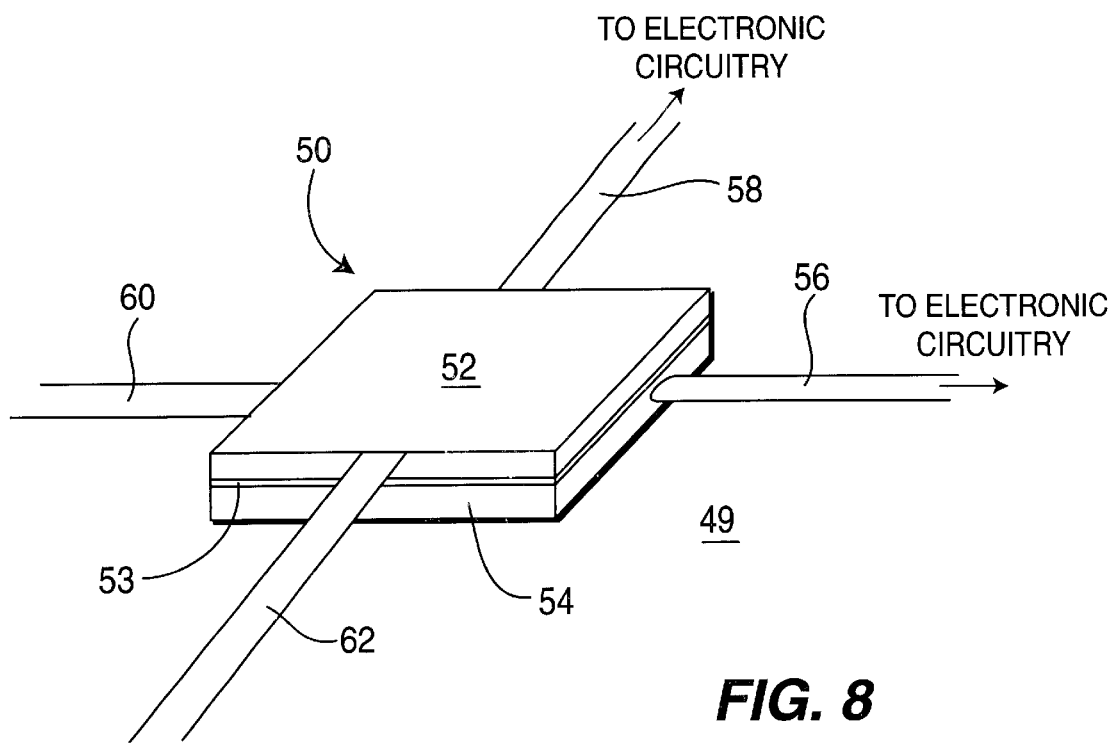
FIG. 8 is a perspective of a bolometer coupled with a heat generating element according to the present invention.

FIG. 8 is a perspective view showing a bolometer device 52 formed over substrate 49 and electrically connected to nulling circuitry (not shown) by means of conductive wires 62 and 58. Bolometer 52 is adapted to receive incident infrared radiation from direction 50. Bolometer 52 is thermally coupled to, but electrically isolated from, heat generating element 54. Dielectric film 53 is interposed between bolometer 52 and heat generating element 54. Heat generating element 54 is electrically coupled to electronic nulling circuitry by means of conductive wires 56 and 60. Heat generating element 54 may be a resistor formed of a section of material such as nichrome, aluminum, or other similar materials which heat in response to a current being passed through them. Bolometer 52 may be formed of vanadium oxide or other commonly available materials which have resistance which varies with temperature. Bolometer 52, heat generating element 54 and the conductive wires may be formed and patterned using conventional methods. It can be seen that bolometer 52 thus includes a resistance which varies responsive to both incident infrared radiation which it may absorb, and current being supplied to heat generating element 54 which thereby heats bolometer 52. Nulling circuitry (not shown) is coupled to bolometer 52 to read the resistance of the device. Nulling circuitry develops a signal, once the resistance changes due to the thermal action of the infrared radiation, which is delivered to heat generating element 54 to counteract the effect of the infrared radiation and maintain the resistance of the bolometer at an essentially constant value.

III. Nulling Circuitry

Figure 9:
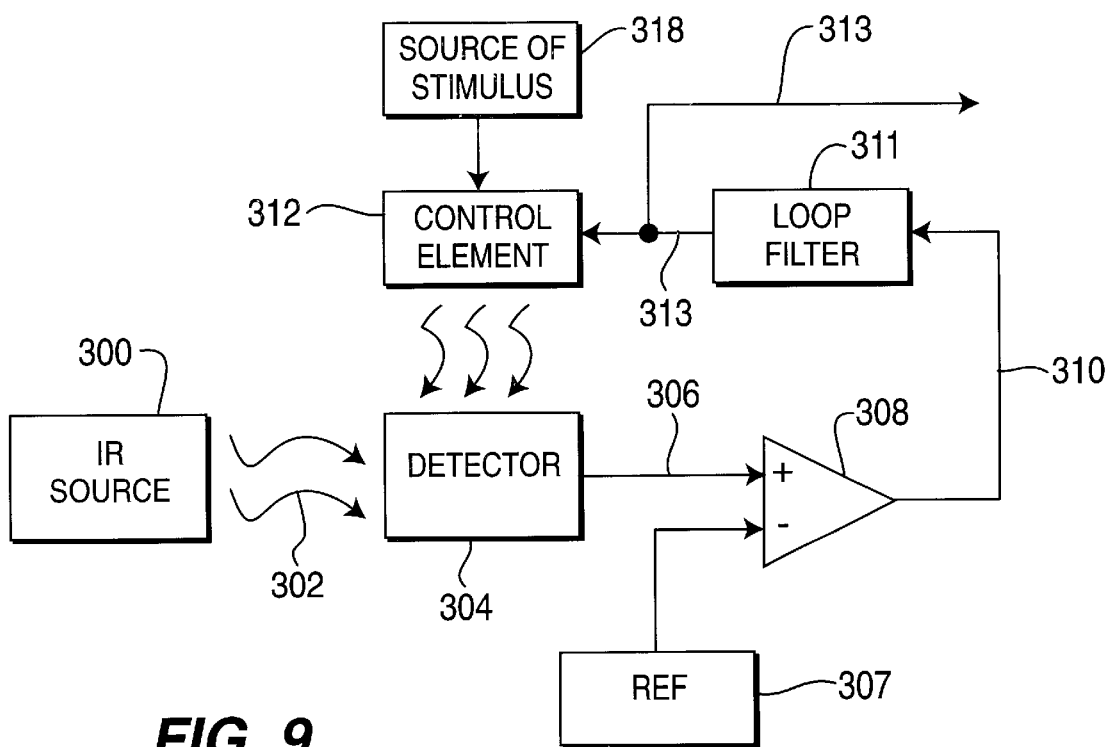
FIG. 9 is a diagram including a circuit diagram showing the method of the present invention.

FIG. 9 shows the concept of a nulling circuitry used in the present invention. Detector 304 is exposed to incident radiation 302 from IR source 300. Detector 304 may be any of the various bolometer or micro-cantilever sensing devices described. Detector output 306 may be the resistivity for a bolometer device 304, or it may be the capacitance or degree of bending as determined optically or using capacitive means, of a micro-cantilever device 304.

The nulling circuitry includes, for example, a differential amplifier 308 which acts as a comparator to compare the output signal 306 provided by the detector, to a reference signal provided by a reference signal source 307. The output signal 310 provided by the differential amplifier 308 is proportional to the difference between the output signal 306 of the detector and the reference signal. This signal is applied to a loop filter 311 which may, for example, be a conventional integral plus proportional filter, that generates a control signal 313 for the control element 312. The control signal for the control element 312 is also the output signal of the IR sensor. In response to the control signal 313, the control element 312 provides a stimulus 314 to the detector 304 that compensates for the incident IR radiation 302, tending to maintain the output signal 306 of the detector at the value of the reference signal provided by the source of reference signal 307.

The output signal 306 of the detector 304 is essentially maintained at a constant level by the nulling circuitry. Directly in response to being exposed to infrared radiation, detector output signal 306 will initially change as evidenced by bending of the micro-cantilever or changed resistivity of the bolometer. Differential amplifier 308 is a high-gain device, capable of detecting this small change and providing a corrective signal 310 which is integrated by the loop filter 311 to produce a control signal 313 that compensates for the temporary change, and restores detector output signal 306 to an "original" value. In this manner, an essentially constant original value is maintained.

Element 312 is the element which receives control 313 and, in response, provides a stimulus 314 to detector 304 which influences output signal 306 of the detector 304. As described above, element 312 may be a piezoelectric element and loop signal 310 may be a voltage which urges piezoelectric element 312 to provide stimulus 314 which may be a stress upon micro-cantilever detector 304.

In another exemplary embodiment wherein element 312 is a pair of electrodes capable of providing an electrostatic charge to detector 304, control signal 313 may be a voltage supplied to element 312 which in turn provides an electric field stimulus 314 that urges the micro-cantilever detector 304 in a direction opposite to the bending direction caused by the incident IR radiation 302.

In a third exemplary embodiment, element 312 may be a heat generating element such as a resistor. According to this exemplary embodiment, control signal 313 may be a current supplied to element 312 to cause element 312 to heat or it may be a control signal to element 312 which causes it to reduce the level of a current signal 318 that is applied to the element 312, causing the control element to reduce the heat 314 that is applied to the detector 304, maintaining the net applied heat at a constant value. Stimulus 314, then, would be heat supplied to detector 304 which may be a bolometer or micro-cantilever.

The original value of the detector output signal 306 may simply be the detector output signal when the detector 304 is not exposed to incident infrared radiation 302. In an alternative embodiment, for example, when a heat generating element is used as element 312, the original position may include the detector output signal being urged by an initial stimulus provided by element 312 such as original stimulus. The original stimulus may be initially supplied to detector 304 to establish an initial position of detector 304 so that, when incident infrared radiation 302 changes the magnitude of detector output signal 306, sensor 308 and loop filter 311 may provide the control signal 313 to element 312 such that stimulus 314 supplied to detector 304 is less than original stimulus in order to maintain detector output 306 at substantially a constant level. In other words, the adjusted signal necessary to maintain a substantially constant level, is a reduced signal. Initial signal 318 may be provided to element 312, initially, to deliver original stimulus 314.

Also for each of the embodiments described, regardless of the nature of control signal 313, the control signal 313 is the output signal of the IR sensor. This signal may be used to provide a visible image which has an intensity based upon the strength of signal 313. Conventional methods may be used. An example of such a method is as disclosed in the above-referenced U.S. patent. As such, it can be also understood that, as the amount of incident radiation 302 is increased, control signal 313 is adjusted to maintain detector output signal 306 substantially at a constant level. In this manner, an increase in incident radiation increases the intensity of a visual image produced without being limited by the linear range of the detector used.

It should be further understood that loop control signal 313 serves to counteract the effect of incident radiation. This is true, for example, when incident radiation causes an increase in the resistivity of a bolometer. In this case, control signal 313 is provided to element 312 to decrease the resistivity of the bolometer. The converse is also true. Either may be accomplished, for example, by either reducing or increasing the current supplied to the resistor which heats in response to supplied current.

A micro-cantilever, for example, may bend towards or away from incident infrared radiation depending on construction. Regardless, the control signal 313 is provided to element 312 to counteract the effect of the bending urged by exposure to infrared radiation. For example, a micro-cantilever may bend away from the substrate when its temperature is increased due to infrared radiation. In this case, either an initial signal supplied to a heater formed on the micro-cantilever may be reduced, or a voltage may be applied to a piezoelectric element formed on the micro-cantilever in such a manner as to deflect the micro-cantilever downward, or, an electrostatic charge may be provided across electrodes formed within the substrates and the micro-cantilever, to urge the cantilever downward.

According to each of the exemplary embodiments, the nulling circuitry shown in FIG. 9 includes a control function having a time constant such that the feedback loop shown in FIG. 9 operates continuously and without oscillation. In this sense, although detector output signal 306 changes incrementally while detector 304 is being exposed to incident infrared radiation, the feedback loop is such that detector output signal 306 is quickly restored to its original value. It can therefore be stated that detector output signal 306 is essentially "maintained" at a constant original value.

It should be once again emphasized that although the infrared detector and nulling circuitry have been described in conjunction with a single infrared detector and system, the present invention finds particular application for an infrared imager consisting of a plurality of such detectors, each coupled to nulling circuitry and forming an array from which a visible image may be produced.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents such as equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

What is claimed:

1. An infrared imager formed on a semiconductor substrate, comprising:

a plurality of infrared sensors, each infrared sensor forming a picture element (pixel) of the infrared image, each of said infrared sensors separately comprising:

a deflectable bi-material micro-cantilever, said micro-cantilever being deflectable in response to each of incident infrared radiation and a further stimulus, and having a reference position relative to the substrate when not exposed to said infrared radiation and said further stimulus;

a control element integral to the semiconductor substrate responsive to a control signal for providing said further stimulus to said deflectable bi-material micro-cantilever; and an electronic circuit coupled to each of said micro-cantilever and said control element, capable of reading a position of said micro-cantilever including said reference position, and capable of determining and providing said control signal to said control element sufficient to maintain said micro-cantilever substantially at said reference position when said micro-cantilever is exposed to infrared radiation.

2. The infrared imager as in claim 1, wherein said control element comprises one of a heat generating element, a pair of conductive plates coupled to an electronic circuit and capable of providing an electrostatic change therebetween, and a piezoelectric element.

3. A method for converting infrared radiation to a visible image comprising the steps of:

(a) providing a bi-material micro-cantilever on a semiconductor substrate, said micro-cantilever including a deflectable plate and a heat generating element coupled to said micro-cantilever, said micro-cantilever being bendable responsive to each of incident infrared radiation and heat from said heat generating element;

(b) providing a control signal to said heat generating element thereby generating heat, said control signal having a first value;

(c) measuring a reference position of said micro-cantilever;

(d) exposing said bi-material micro-cantilever to incident infrared radiation;

(e) adjusting said control signal to said heat generating element sufficient to maintain said micro-cantilever substantially at said reference position, said adjusted control signal having a second value; and (f) providing an output signal proportional to a difference between said first value and said second value.

4. The method as in claim 3, wherein said step (c) comprises optically measuring said reference position of said micro-cantilever.

5. The method as in claim 3, wherein said step (a) includes said deflectable plate including a conductive film forming an upper electrode of a capacitor and further includes a lower electrode of said capacitor formed within said substrate beneath said first electrode;

step (c) comprises measuring capacitance of said capacitor; and step (e) includes adjusting said control signal to said heat generating element to maintain said capacitance substantially at a constant value.

6. The method as in claim 3, wherein said heat generating element comprises a resistor formed on said micro-cantilever, step (b) comprises providing a current to said resistor, and said step (e) includes adjusting said current provided to said resistor.

7. A method for converting infrared radiation to a visible image comprising the steps of:

(a) providing a plurality of infrared sensors arranged as a matrix of pixel elements (pixels), each of said infrared sensors separately comprising a bi-material micro-cantilever on a semiconductor substrate, said micro-cantilever including a deflectable plate and a piezoelectric element formed on said micro-cantilever, said micro-cantilever being bendable responsive to each of incident infrared radiation and stress from said piezoelectric element;

(b) measuring a reference position of said micro-cantilever;

(c) exposing said bi-material micro-cantilever to incident infrared radiation;

(d) providing a control signal to said piezoelectric element sufficient to maintain said micro-cantilever substantially at said reference position; and (e) successively providing an output signal proportional to said control signal from each of the plurality of infrared sensors as a signal representing the visible image.

8. The method as in claim 7, wherein said step (d) includes supplying a voltage to electrically bias said piezoelectric element thereby forming a stress within said piezoelectric element, said stress causing said micro-cantilever to bend and wherein said step (e) comprises providing said output signal proportional to said voltage from each of the plurality of infrared sensors as a signal representing the visible image.

9. The method as in claim 7, wherein said piezoelectric element is formed of barium titanate.

10. The method as in claim 7, wherein said step (a) includes said deflectable plate including a conductive film forming an upper electrode of a capacitor and further includes a lower electrode of said capacitor formed within said substrate beneath said first electrode;

step (b) comprises measuring capacitance of said capacitor; and step (d) includes further measuring said capacitance and providing said control signal to said piezoelectric element sufficient to maintain said capacitance at a substantially constant value.

11. A method for converting infrared radiation to a visible image comprising the steps of:

(a) providing a plurality of infrared sensors arranged as a matrix of pixel elements (pixels), each of said infrared sensors separately comprising a bi-material micro-cantilever coupled to a semiconductor substrate, said micro-cantilever including a deflectable first conductive plate, and a second conductive plate formed within said substrate beneath said micro-cantilever, said micro-cantilever being bendable responsive to each of incident infrared radiation and an electrostatic charge formed between said first conductive plate and said second conductive plate;

(b) measuring a reference position of said micro-cantilever;

(c) exposing said bi-material micro-cantilever to incident infrared radiation;

(d) providing an electrostatic charge between said first conductive plate and said second conductive plate sufficient to maintain said micro-cantilever substantially at said reference position; and (e) successively providing an output signal proportional to said electrostatic charge from each of the plurality of infrared sensors as a signal representing the visible image.

12. The method as in claim 11, wherein said step (b) comprises optically measuring said reference position of said micro-cantilever.

13. The method as in claim 11, wherein each of said steps (b) and (d) include measuring a capacitance between said first and second conductive plates using an alternating current (AC) supply, and said step (d) includes providing an electrostatic charge using a (DC) direct current supply.

14. A method for converting infrared radiation to a visible image comprising the steps of:

(a) providing an array of bi-material micro-cantilevers on a semiconductor substrate, each micro-cantilever including a deflectable plate and a control element coupled to said micro-cantilever, each micro-cantilever being deflectable responsive to each of incident infrared radiation and a stimulus provided by said corresponding control element;

(b) measuring a reference position of each micro-cantilever of said array of bi-material micro-cantilevers relative to the substrate;

(c) exposing said array to incident infrared radiation;

(d) for each micro-cantilever of said array of micro-cantilevers, supplying a control signal to said control element capable of producing a stimulus sufficient to maintain said micro-cantilever substantially at said reference position; and (e) providing a visible image having an array of pixels corresponding to said array of micro-cantilevers, each pixel including an intensity being proportional to said corresponding control signal supplied to said respective control element.

15. An infrared imager array formed on a semiconductor substrate, comprising:

a plurality of infrared sensors, each infrared sensor forming a picture element (pixel) on an infrared image, each of said infrared sensors seperately arranged in rows and columns, each of said infrared sensors separately comprising:

a deflectable bi-material micro-cantilever, said micro-cantilever being deflectable in response to each of incident infrared radiation and a further stimulus, and having a reference position when not exposed to said infrared radiation or said further stimulus;

a control element integral to the semiconductor substrate responsive to a control signal for providing said further stimulus to said deflectable bi-material micro-cantilever; and an electronic circuit coupled to each of said micro-cantilever and said control element, capable of reading a position of said micro-cantilever including said reference position, and capable of determining and providing said control signal to said control element sufficient to maintain said micro-cantilever substantially at said reference position when said array is exposed to infrared radiation, wherein said control element provides said stimulus in response to said control signal.

16. The infrared imager array as in claim 15, wherein said control element comprises a piezoelectric material and said further stimulus comprises stress.

17. The infrared imager array as in claim 15, wherein said control element comprises a pair of electrodes and said further stimulus comprises electrostatic charge formed between said pair of electrodes.

18. An infrared imager array formed on a semiconductor substrate, comprising:

a plurality of infrared sensors arranged in rows and columns, each of said infrared sensors separately comprising:

a deflectable bi-material micro-cantilever, said micro-cantilever being deflectable in response to each of incident infrared radiation and a further stimulus, and having a reference position when not exposed to said infrared radiation or said further stimulus;

a heat generating control element responsive to a control signal for providing said further heating stimulus to said deflectable bi-material micro-cantilever; and an electronic circuit coupled to each of said micro-cantilever and said control element, capable of reading a position of said micro-cantilever including said reference position, and capable of determining and providing said control signal to said control element sufficient to maintain said micro-cantilever substantially at said reference position when said array is exposed to infrared radiation, wherein said heat generating control element provides said heating stimulus in response to said heat generating control signal.

19. An infrared imager array formed on a semiconductor substrate, comprising:

a plurality of infrared sensors arranged in rows and columns, each of said infrared sensors separately comprising:

a bottom electrically conductive plate formed within said substrate;

a capacitor comprising a top electrically conductive plate and said bottom electrically conductive plate, said top electrically conductive plate being formed above said bottom electrically conductive plate;

a bi-material element comprising a top layer and a bottom layer;

an absorber element formed on a portion of said top electrically conductive plate; and a thermal isolation support element, a first side contacting said bi-material element and a second side contacting said substrate for anchoring said bi-material element, said absorber element, and said top electrically conductive plate to said substrate, wherein said bi-material element, said absorber element, and said top electrically conductive plate form a bendable member;

a corresponding plurality of control elements, each coupled to a corresponding infrared sensor and capable of urging said bendable member to bend; and an electronic circuit capable of measuring a capacitance of each capacitor and further capable of supplying a control signal to each corresponding control element to maintain each respective capacitance at a substantially constant value when said array is exposed to infrared radiation.

\* \* \* \* \*